(12) United States Patent
Bernard et al.

(10) Patent No.: US 7,226,545 B2
(45) Date of Patent: Jun. 5, 2007

(54) ISOCYNATE COMPOSITION COMPRISING A MASKED ISOCYANATE AND A NONMASKED AND THEIR USE IN A COATING

(75) Inventors: Jean-Marie Bernard, Mornant (FR); Bernard Vogin, Chaponost (FR)

(73) Assignee: Rhodia Chimie, Aubervilliers (FR)

( * ) Notice: Subject to any disclaimer, the term of this patent is extended or adjusted under 35 U.S.C. 154(b) by 540 days.

(21) Appl. No.: 10/702,943

(22) Filed: Nov. 6, 2003

(65) Prior Publication Data

US 2004/0097686 A1    May 20, 2004

Related U.S. Application Data

(63) Continuation of application No. 09/744,497, filed on Jan. 24, 2001, now abandoned.

(51) Int. Cl.
*C09K 3/00*    (2006.01)

(52) U.S. Cl. .................................................. 252/182.21

(58) Field of Classification Search ............ 252/182.21
See application file for complete search history.

(56) References Cited

U.S. PATENT DOCUMENTS

| | | | | |
|---|---|---|---|---|
| 3,642,553 | A | * | 2/1972 | Georges ................. 156/307.5 |
| 4,284,544 | A | * | 8/1981 | Wegner et al. ............. 524/723 |
| 5,149,805 | A | | 9/1992 | Gras et al. |
| 6,291,624 | B1 | | 9/2001 | Ardaud et al. |

FOREIGN PATENT DOCUMENTS

EP    0 822 210    2/1998

OTHER PUBLICATIONS

Sworn Translation of EP 0 822 210.
Sworn translation of FR 98/09,699.
Sworn translation of PCT/FR97/01421 (WO 98/04608).

* cited by examiner

*Primary Examiner*—Cephia D. Toomer

(57) ABSTRACT

The invention concerns an isocyanate composition useful for applying powder paints. Said composition is characterized in that it contains a masked isocyanate compound and an unmasked cycloaliphatic isocyanate compound. The invention is applicable in the chemistry of paints.

13 Claims, No Drawings

ISOCYNATE COMPOSITION COMPRISING A MASKED ISOCYANATE AND A NONMASKED AND THEIR USE IN A COATING

This application is a continuation of U.S. application Ser. No. 09/744,497, filed on Jan. 24, 2001 now abandoned.

A subject matter of the present invention is a novel family of isocyanate compositions comprising both masked isocyanates and nonmasked isocyanates. It relates more particularly to isocyanate compositions for the purpose of their use in the powder form, including in the form of a mixture of powders, more specifically for forming paint powders referred to as single-component powders (sometimes denoted by the name "one shot").

For reasons related to environmental protection and work safety, attempts are increasingly being made to eliminate the use of solvents in coating techniques and in particular in painting techniques. More particularly, the reduction in V.O.C.s (volatile organic compounds) is an increasingly current preoccupation in the paint and varnish industry.

With this aim, the change in products towards higher solid contents makes it possible to reduce the amounts of solvents needed to achieve the applicational viscosity and thus to reduce the solvents evaporated during the drying of the paint film.

An alternative to this technique is the use of aqueous-phase products where water has replaced organic solvents as agent for conveying the organic binder. However, an amount of organic solvent, admittedly a low amount, remains necessary for the processing and for the formation of the paint film. Furthermore, they generate water-soluble residues, the treatment of which can be problematic and expensive.

In this context, techniques for coating by means of powder have been increasingly developed. It is advisable here to briefly describe this technique in order to get a better understanding of the present invention.

The technique employs a very fine pulverulent material for which air will act as carrier.

Generally, an electrostatic charge of several kilovolts applied between a spray gun and the item to be painted will make it possible to attract and to retain the precursor powder of the coating, which powder will be sprayed out by the applicational spray gun.

Once covered with powder, the item is subjected to baking, generally at a temperature of between 150 and 200° C., which baking will make possible the melting, the spreading and then the crosslinking of the paint powder in order to obtain a uniform homogeneous layer of the coating. Here and in the continuation of the description, paint will be regarded as the paradigm of the coatings.

This technique is nonpolluting and exhibits an applicational yield in the vicinity of 100% by virtue of the possibility of recycling the unused powder. For further details on powder paint techniques, reference may be made to the following works:

P. Grandou and P. Pastour: Peintures and Vernis [Paints and Varnishes].
   I. Constituents
   II. Technique and industries; published by Hermann;
R. Lambourne:
   Paints and Surface Coatings, Theory and practice; published by Halsted Press;
Powder Coating, The Complete Finisher Handbook; The Powder Coating Institute;
Myers and Long;
Treatise on Coatings, 5 volumes; published by Marcel Dekker.

Mention should be made, among the families of products which can be employed in the field of powders, of the following. Most of the market is taken up by epoxy-polyester powder dyes referred to as "hybrid" epoxy-polyester powder dyes, followed by polyesters, polyurethanes and then powders referred to as "epoxy" powders. If high quality exterior behavior (in particular with respect to actinic and atmospheric attacks) is desired, it is then advisable to use coatings based on TGIC-polyesters or else on polyurethanes, which alone make it possible to achieve the performances usually required.

However, the TGIC-polyester system is supposed to be toxic and regulatory restrictions are about to very considerably restrict their use.

As regards polyurethanes, the only powder products currently on the market are products which result from a system in which the crosslinking agent is an isocyanate masked by caprolactam of a very specific type, namely IPDI derivatives.

However, the use as crosslinking or curing agent of IPDI derivatives does not always result in products of good mechanical property. In a prior patent application (EP 680 984), the Applicant Company discloses a system with a blocking agent which makes it possible to significantly widen the family of aliphatic isocyanates which are capable of giving solid products with a sufficient Tg (glass transition temperature) to make possible use in powder applications.

This technique has led, with the collaboration of the Catalan company Resisa (now Cray Valley Ibérica), to a matt or satin painting system with a particularly outstanding performance (see the International Patent Application published under No. WO 98/04 608).

However, in order to have a sufficient glass transition temperature, the products disclosed in European Patent Application No. EP A 0 680 984 must meet fairly strict restrictions relating to residual isocyanate functional group content.

In addition, the products disclosed in the abovementioned European Application only represent a small fraction of the masking agents which can be used and which it would be pleasant to be able to employ in the powder paint technique. There is consequently a search for techniques which make it possible to increase the glass transition temperature of the crosslinking agents, sometimes also known as curing agents.

Thus, one of the aims of the present invention is to provide a technique and compositions which make it possible to obtain isocyanate compositions which can be used in powders and which exhibit a glass transition temperature which prevents phenomena of caking during transportation and storage.

Another aim of the present invention is to provide a technique which makes it possible to increase the glass transition temperature of masked aliphatic isocyanates, so as to be able to use them in applications referred to as "powder paint" applications.

Another aim of the present invention is to provide isocyanate mixtures with a Tg at least equal to 20° C. (advantageously two significant figures), preferably to 25° C. and more preferably to 30° C.

Another aim of the present invention is to provide isocyanate compositions capable of exhibiting high free isocyanate contents which can be used in powder paints.

These aims and others which will become apparent subsequently are achieved by means of an isocyanate composition comprising both a masked isocyanate compound and a nonmasked cycloaliphatic isocyanate compound and the use of said composition as ingredient of a coating, advantageously in the powder form.

The masked isocyanate compound exhibits an aliphatic backbone which comprises, in said backbone, at least one di- or polymethylene linkage. The masked isocyanate compound results from a polymethylene diisocyanate monomer, from one of the (co)oligomers of the latter or from one of its (co)oligocondensates. The polymethylene diisocyanate monomer is tetra-, penta- or hexamethylene diisocyanate, substituted at the most once. The (co)oligomers or (co) oligocondensates comprise at least one imidazolinedione, isocyanuric, biuret, allophanate or polyol carbamate functional group.

The present invention is based on a two-fold observation, namely that it is possible to use isocyanates exhibiting free isocyanate functional groups in powder paint without restrictive operating conditions, provided that they are mixed with a significant amount of masked isocyanate functional groups.

The other observation is that the increase in content of free isocyanates makes it possible, under certain conditions, to significantly increase the glass transition temperature.

These two observations are particularly surprising to a person skilled in the art.

The invention is particularly advantageous in the case of masked isocyanates with an aliphatic nature. In the present description, any isocyanate functional group in which the nitrogen atom is connected to a carbon atom with $sp^3$ hybridization is regarded as aliphatic.

According to the present invention, the masked isocyanate, pure or as a mixture, results from a polyisocyanate, that is to say having at least two isocyanate functional groups, advantageously more than two (possibility of a fractional value since it is generally a more or less condensed mixture of oligomers), which itself generally results from a precondensation or from a prepolymerization of unit diisocyanates (sometimes these unit diisocyanates are denoted in the present description by the term "monomers").

These prepolymers and these precondensates are well known to a person skilled in the art and it may be indicated that, generally, the average molecular mass ($M_w$) of these prepolymers or these precondensates is low and is generally at most equal to 2000 (one significant figure), more commonly to 1 000 (one significant figure, preferably two). Thus, mention may be made, among the polyisocyanates used to synthesize the masked isocyanates according to the invention, of those of the biuret type and those which, by their di- or trimerization reaction, have resulted in 4-, 5- or 6-membered rings. Mention may be made, among 6 rings, of the isocyanuric rings resulting from a homo- or from a heterotrimerization of various diisocyanates, alone, with other isocyanates or with carbon dioxide gas; in this case, a nitrogen of the isocyanuric ring is replaced by an oxygen. Oligomers with an isocyanuric ring are preferred. The preferred polyisocyanates are those which exhibit at least one aliphatic isocyanate functional group, advantageously two, preferably all.

Among the masked isocyanate functional groups according to the invention, those which are connected to the backbone via an aliphatic carbon (that is to say of $sp^3$ type) carrying one hydrogen atom, advantageously two, are preferred.

It is also desirable for the said carbon of $sp^3$ type to be itself carried by a carbon of $sp^3$ type, itself also carrying one or preferably two hydrogen atoms, in order to avoid the isocyanate functional group under consideration being in the neopentyl position.

In other words, it is advisable to choose, as monomers (which generally carry two isocyanate functional groups), at least one compound which carries at least one aliphatic functional group which is neither secondary nor tertiary nor neopentyl.

The problem of the masked isocyanates exhibiting a particularly low glass transition temperature is particularly acute in the case where use is made of monomers which exhibit a high conformational freedom and high rotational freedoms.

This is th ecase with the monomer which exhibit polymethylene $(CH_2)\pi$ linkages, were $\pi$ represents an integer form 2 to 10, advantageously from 4 to 8. These polymethylene linkages result in excellent mechanical properties. In addition, it is desirable for at least one, preferably all, these linkages to be free to rotate and thus exocyclic.

In the case of a mixture obtained from several (in general two) types of monomers, it is preferable for that or those of the monomers which corresponds to the above conditions and in particular to the condition with regard to the presence of polymethylene $(CH_2)\pi$ linkages to represent at least one third, advantageously half, preferably two thirds of the masked isocyanate functional groups.

Of course, the results are particularly good when all of the monomer used exhibits this characteristic of having polymethylene linkages.

The above restrictions are applicable both in the case of prepolymers or of precondensates obtained from a mixture of monomers and of prepolymers and of precondensates obtained by simple mixing of prepolymers and of precondensates.

The present invention is particularly advantageous for masked isocyanates with a Tg at most equal to 40° C., advantageously at most equal to 30° C., preferably at most equal to 20° C., more preferably of less than 20° C.

Thus, the present invention is particularly advantageous for masked isocyanates which do not exhibit masked isocyanate functional groups which are carried by an endocyclic cycloaliphatic carbon. This is because these masked isocyanates often naturally exhibit glass transition temperatures which are greater than those of masked non-cycloaliphatic isocyanates, in particular resulting from polymethylene diisocyanate.

Thus, the invention exhibits numerous advantages for polymethylene diisocyanate derivatives, among which may be mentioned hexamethylene diisocyanate, tetramethylene diisocyanate and a hexamethylene diisocyanate isomer, namely pentamethylene diisocyanate substituted by a methyl.

The masked isocyanates result from free isocyanates by reaction with various masking agents.

The masking agents which are particularly suitable for the present invention are those which, in the octanol test, exhibit a release temperature at least equal to 100° C., advantageously to 110° C., preferably to 120° C. The release temperature is advantageously at most equal to 200° C., preferably 180° C.

The masked isocyanates according to the present invention can be masked by several masking agents. Mention should be made, among masking agents, of triazole, its derivatives and the various compounds mentioned in the patents cited in the present application.

The nonmasked isocyanates according to the present invention exhibit an aliphatic ring. It is also desirable for them to be chosen from compounds with a glass transition temperature at least equal to approximately 40° C.

The compounds which are particularly well suited are the oligomers or the oligocondensates of cycloaliphatic monomers, that is to say the backbone of which comprises an aliphatic ring. Among these products, those which are preferred are those which result from the homo- or from the heterotrimerization of a cycloaliphatic monomer.

These monomers are advantageously such that at least one, advantageously both, isocyanate functional groups are distant from the closest ring by at most one carbon and preferably is connected directly to it. In addition, these cycloaliphatic monomers advantageously exhibit at least one, preferably two, isocyanate functional groups chosen from secondary, tertiary or neopentyl isocyanate functional groups.

The best results are obtained when the conformational freedom of the cycloaliphatic monomer is low. Mention may be made, as monomers capable of giving good results, of, by way of example and even of paradigm, the following monomers:
- the compounds corresponding to the hydrogenation of the aromatic nucleus or nuclei carrying isocyanate functional groups of aromatic isocyanate monomer and in particular of TDI (toluene diisocyanate) and of diisocyanatobiphenyls, the compound known under the abbreviation $H_{12}MDI$ and the various BICs [Bis(isocyanatomethylcyclohexane)]; and in particular norbornane diisocyanate, often known by the abbreviation NBDI;
- isophorone diisocyanate or IPDI or 3-isocyanatomethyl-3,5,5-trimethylcyclohexyl isocyanate.

In order to obtain an effect on the increase in glass transition temperature of the composition, it is preferable for the (FI/MI) ratio by mass of the free isocyanate compound(s) to the masked isocyanate compound(s) to be at least equal to 0.1, advantageously to 0.2, preferably to 0.3.

On the other hand, in order to maintain the qualities related to the masked isocyanates (in part at least noncyclic isocyanates), it is preferable for the (FIF/MIF) ratio in equivalents of the free isocyanate functional groups to the masked isocyanate functional groups to be at most equal to approximately 1, advantageously to 1.0, preferably to 0.7.

The compositions according to the present invention can easily be prepared by mixing the free isocyanate in the molten masked isocyanate (see the procedure in the examples), advantageously at a temperature of less than that of the deblocking.

The presence of a catalyst for condensation between the masking agents and the isocyanates is not harmful in any way. This is particularly true for tertiary amines (in a ratio of 0.1 to 5% in molar equivalents with respect to the combined masked and nonmasked isocyanate functional groups), which are often used as catalyst.

The present application is also targeted at the use, according to the techniques specified above, of the cycloaliphatic compound with a glass transition temperature at least equal to 40° C. for raising the glass transition temperature of masked aliphatic isocyanates.

| OCTANOL TEST - Definitions | |
|---|---|
| "Release" (or "deblocking") temperature: | This is the lowest temperature at which the masking agent of the masked isocyanate is 9/10 (mathematically rounded-off) displaced by a primary monoalcohol (the primary alcohol is generally octanol). |
| Shelf life: | In order to ensure a good shelf life, it is preferable to choose masked isocyanate functional groups for which the octanol test shows a "release" at 80° C., advantageously at 90° C., at most equal to 90%. |
| Progress of the reaction: | The reaction is considered to be complete if it is carried out to more than 90%. |

Procedure

Approximately 5 mmol of protected masked NCO equivalent to be evaluated are charged to a Schott-type tube with magnetic stirring.

2.5 to 3 ml of 1,2-dichlorobenzene (solvent) the equivalent of 1-octanol (5 mmol, i.e. 0.61 g, and optionally with the catalyst to be tested with the masking group) are added.

The reaction medium is subsequently brought to the test temperature. Heating is then carried out for 6 h at the test temperature, so as to deblock and thus render reactive the isocyanate functional groups. On completion of the reaction, the solvent is removed by vacuum distillation and the residue is analyzed by NMR, mass and infrared.

The percentage of masked isocyanate functional groups condensed with the 1-octanol is evaluated from these data.

The following nonlimiting examples illustrate the invention.

Examples of powder syntheses with free NCO IPDT.

EXAMPLE 1

Synthesis of a Powder Polyisocyanate Composition (Triazole-blocked HDT/IPDT (70/30 Weight/Weight))

290 g of hexamethylene diisocyanate trimer (Tolonate HDT) (NCO content: 0.521 equivalent/100 g), 107.5 g of 1,2,4-triazole and 3.98 g of triethylamine (1% by mass with respect to all the compounds/2.6 molar % with respect to the free NCO functional groups of the HDT) are successively added to a stirred jacketed reactor. The reaction medium is heated to 95° C. The reaction is exothermic and the temperature of the reaction medium rises to 125° C. The temperature gently falls back to 95° C. After 1 h 30, infrared analysis of a withdrawn sample shows that all the isocyanate functional groups are blocked by the triazole. 170.5 g of isophorone diisocyanate trimer (IPDT) (NCO content: 0.45 equivalent/100 g) are then added at 110° C. After mixing for a quarter of an hour, the product is cast and then milled to give 568 g of a white powder with a Tg of 34° C. which is stable on storage.

The composition thus comprises an HDT polyisocyanate with isocyanate functional groups which are masked by a single blocking agent and a cycloaliphatic polyisocyanate with free isocyanate functional groups.

EXAMPLE 2

Synthesis of a Powder Polyisocyanate Composition (HDT Blocked with Triazole/Para-hydroxybenzoic Acid (80/20 mol/mol)/IPDT (70/30 Weight/Weight))

TOL 6598

201.84 g of Tolonate HDT, 58.11 g of 1,2,4-triazole and 33.41 g of para-hydroxybenzoic acid are successively added to a stirred 500 ml jacketed reactor. The reaction mixture is heated to 90° C. After reacting for one hour, 2.93 g of triethylamine are added. After 1 h 30, infrared analysis of a withdrawn sample shows that all the isocyanate functional groups are blocked by the triazole. 125.73 g of isophorone diisocyanate trimer are then added at 110° C. After mixing for 1 h, the product is cast and then milled to give 420 g of a white powder with a Tg of 45° C. (i.e. 20° C. more than the product to which IPDT has not been added) which is stable on storage.

The composition thus comprises an HDT polyisocyanate with isocyanate functional groups masked by a system of blocking agents, one of which comprises a carboxylic acid functional group, and a cycloaliphatic polyisocyanate with free isocyanate functional groups.

The absorption spectra show NCO, amide and anhydride functional groups.

Everything happens as if the masked isocyanate protected or stabilized the nonmasked isocyanate.

EXAMPLE 3

Comparative

Triazole-masked HDT

The following are successively charged to a 250 ml reactor 107.5 g of hexamethylene diisocyanate isocyanurate trimer known under the trade name HDT, the content of isocyanate (NCO) functional groups of which is 0.526 mol of NCO functional groups per 100 g of product, 39.3 g of 1,2,4-triazole (with a purity equal to 99.5%).

The reaction mixture is subsequently heated to a temperature of 130° C. and stirred. After reacting for 1 h, infrared analysis of a sample of the reaction mass shows that the reaction for the masking of the isocyanate functional groups is complete. The disappearance of the band signifying the isocyanate functional groups at 2272 cm$^{-1}$ is observed.

The product is then poured onto a plate and then left to cool. The product is subsequently milled at a temperature of −10° C.

At ambient temperature, the milled product behaves like an instant adhesive (sticky like pitch) and does not give a powder which can be can be handled under conventional industrial conditions, in particular at ambient temperature (approximately 20° C.).

The measured Tg of the product is 10° C.

The invention claimed is:

1. An isocyanate composition comprising:
    a masked isocyanate compound at least partially aliphatic, exhibiting an aliphatic backbone which comprises, in said backbone, at least one di- or polymethylene linkage, and no masked isocyanate functional groups carried by an endocyclic cycloaliphatic carbon, and
    a nonmasked cycloaliphatic isocyanate compound, said cycloaliphatic isocyanate being an oligomer of a cycloaliphatic monomer.

2. The composition as claimed in claim 1, wherein said cycloaliphatic isocyanate results from the homo- or from the heterotrimerization of a cycloaliphatic monomer.

3. The composition as claimed in claim 1, wherein said nonmasked isocyanate compound exhibits at least one or two isocyanate functional groups which are a secondary, tertiary or neopentyl isocyanate functional group.

4. The composition as claimed in claim 1, wherein the nonmasked isocyanate compound and the masked isocyanate compound present a ratio by mass: nonmasked isocyanate compound masked isocyanate of at least equal to 0.1.

5. The composition as claimed in claim 4, wherein the ratio is at least equal to 0.3.

6. The composition as claimed in claim 1, wherein the nonmasked isocyanate compound and the masked isocyanate compound present a ratio in equivalents: nonmasked isocyanate compound/masked isocyanate of at most equal to 1.

7. The composition as claimed in claim 6, wherein the ratio is at most equal to 0.7.

8. A process for the preparation of a composition as defined in claim 1, wherein the nonmasked isocyanate is mixed in the masked isocyanate which is in a molten state.

9. The composition, as claimed in claim 1 in the form of a powder.

10. The composition as claimed in claim 1, wherein said masked isocyanate compound results from a polymethylene diisocyanate monomer, one (co)oligomer of said monomer or one (co)oligocondensate of said monomer.

11. The composition as claimed in claim 10, wherein said polymethylene diisocyanate monomer is tetra-, penta- or hexamethylene diisocyanate, substituted at the most once.

12. The composition as claimed in claim 11, wherein said (co)oligomer or (co)oligocondensate comprises at least one imidazolinedione, isocyanuric, biuret, allophanate or polyol carbamate functional group.

13. The composition as claimed in claim 1, wherein said nonmasked cycloaliphatic isocyanate exhibits a Tg at least equal to about 40° C.

* * * * *

UNITED STATES PATENT AND TRADEMARK OFFICE
CERTIFICATE OF CORRECTION

PATENT NO. : 7,226,545 B2  
APPLICATION NO. : 10/702943  
DATED : June 5, 2007  
INVENTOR(S) : Jean-Marie Bernard et al.

Page 1 of 1

It is certified that error appears in the above-identified patent and that said Letters Patent is hereby corrected as shown below:

On the Title page, Item (54) and in the Specification, Column 1, Line 1, the Title should read:

ISOCYANATE COMPOSITION COMPRISING A MASKED ISOCYANATE AND A NONMASKED AND THEIR USE IN A COATING

On the Title page, the Related U.S. Application Data and Foreign Application Priority Data section are incomplete:

It should read:

Related U.S. Application Data

(63) Continuation of Application No. 09/744,497, filed on Jan. 24, 2001, now abandoned, which is a 371 of international application No. PCT/FR99/01858, filed on Jul. 28, 1999.

(30) Foreign Application Priority Data

Jul. 29, 1998 (FR)                          98/09699

Signed and Sealed this  
Fifth Day of April, 2016

Michelle K. Lee  
*Director of the United States Patent and Trademark Office*